United States Patent [19]

Hoyt

[11] Patent Number: 4,769,267

[45] Date of Patent: Sep. 6, 1988

[54] SANDWICH COMPOSITE CHAMOIS-FOAM AND METHOD

[75] Inventor: William H. Hoyt, Boston, Mass.

[73] Assignee: Drutan Products, Inc., Haverhill, Mass.

[21] Appl. No.: 95,313

[22] Filed: Sep. 10, 1987

Related U.S. Application Data

[63] Continuation-in-part of Ser. No. 899,659, Aug. 25, 1986, abandoned.

[51] Int. Cl.$^4$ ............................. B32B 7/12; B32B 9/02; B32B 9/04

[52] U.S. Cl. ........................................ 428/71; 15/118; 15/244.4; 156/291; 428/157; 428/159; 428/160; 428/198; 428/215; 428/304.4; 428/316.6; 428/317.1; 428/473

[58] Field of Search ...................... 15/118, 244.3, 244.4; 156/290, 291; 428/71, 76, 157, 158, 159, 160, 195, 198, 215, 304.4, 316.6, 317.1, 473

[56] References Cited

U.S. PATENT DOCUMENTS

| 101,777 | 4/1870 | Smith | 15/244.3 |
|---|---|---|---|
| 2,572,349 | 10/1951 | Kaplan | 15/118 |
| 3,040,353 | 6/1962 | Gray | 15/118 |
| 3,083,392 | 4/1963 | Sewell | 15/118 |
| 3,206,784 | 9/1965 | Linenfelser | 15/244.4 |
| 3,661,690 | 5/1972 | Taranto | 15/118 |
| 4,254,530 | 3/1981 | Lambert | 428/473 |
| 4,341,832 | 7/1982 | Barnett et al. | 428/195 |
| 4,603,069 | 7/1986 | Haq et al. | 428/198 |

*Primary Examiner*—William J. Van Balen
*Attorney, Agent, or Firm*—Rines and Rines; Shapiro and Shapiro

[57] ABSTRACT

A chamois-foam laminate sandwich structure is provided to increase the water absorbent properties by foam reservoir pockets and to provide for increased water delivery upon squeezing with substantially the same "hand" and feel as the original chamois.

22 Claims, 2 Drawing Sheets

SANDWICH COMPOSITE CHAMOIS-FOAM AND METHOD

This application is a continuation-in-part of application Ser. No. 899,659, filed Aug. 25, 1986, now abandoned.

The present invention relates to water-absorbing chamois leather structures and methods of forming and utilizing the same, being more particularly concerned with effectively imbuing chamois skin with increased water-holding capacity through composite chamois-foam sandwich or laminate structures and the like.

Chamois leather, being a sheepskin flesher that has been oil tanned (U.S. federal specification KK-300A or CS-99), has long been used for water-absorbing, polishing and water-filtering or water-holding membrane purposes (such as straining gasoline and the like). In use as a drying rag for windows, glass-like surfaces generally, automobile and marine bodies and surfaces in general household use, the water-absorbent characteristics imparted by the tanning of the hollow filters enable them to absorb moisture in a capillary manner with surface tension holding or trapping the water between and within the filters until forced out by volumetric reduction in wringing, or by other externally applied forces. The limitation upon water-holding capacity is the saturation of the filters—usually at 400 to 700 percent of the dry chamois weight.

Underlying the present invention is the discovery that through appropriate matrix-bonding with a rather critically selected flexible, dimensioned and propertied foam layer to form a composite chamois-foam laminate or sandwich structure, the chamois rag or pad becomes effectively imbued with significantly greater water-holding capacity as the foam pockets between the chamois-to-foam bonded regions serve as open reservoirs of larger water-absorbing characteristics per unit of surface area (and volume).

An object of the present invention, accordingly, is to provide a new and improved chamois structure for use as a water-absorbing pad that provides increased absorption and other improved characteristics over chamois skins alone.

A further object is to provide such improved results in a novel composite chamois-foam laminate or sandwich structure and one that retains substantially the same "hand", feel and flexibility of the original chamois skins.

Where the sandwich laminate involves only one chamois skin and the other outer layer is selected for different properties than chamois, such as scrubbing features as by terrycloth or other rough fabric or the like, it has been found desirable to so apply the adhesive between the inner chamois surface and the intermediate foam layer and between the inner surface of the terry cloth or other outer layer as inherently to produce laminating, upon compression with the foam, minute bonding points or regions to the foam layer surface throughout the pad and at least over substantially half the surface area thereof or less, providing remarkable foam reservoirs effects without the necessity for uncompressed foam pockets.

An additional object of the invention, accordingly, is to provide such a novel real chamois-foam-scrubbing layer laminate again with substantially the same feel and hand as the original chamois but with significantly increased absorption and other improved characteristics.

Still another object is to provide novel methods of forming or fabricating such a structure and for utilizing the same.

Other and further objects will be explained hereinafter and are more particularly delineated in the appended claims.

In summary, however, from one of its important aspects, the invention provides a chamois-foam sandwich composite comprising a pair of thin outer water-permeable layers at least one of which is a real chamois skin laminated together with a thin, soft, flexible foam layer therebetween, the layers being adhesively bonded in a matrix of spaced points or regions of the inner surfaces of the outer layers and the adjacent surfaces of the foam layer throughout the foam layer. Preferred and best mode embodiments and details are later presented.

The invention will now be described with reference to the accompanying drawing,

FIG. 1 of which is an isometric view of an embodiment with layers partially peeled apart to illustrate details and method of construction;

Figure 1:
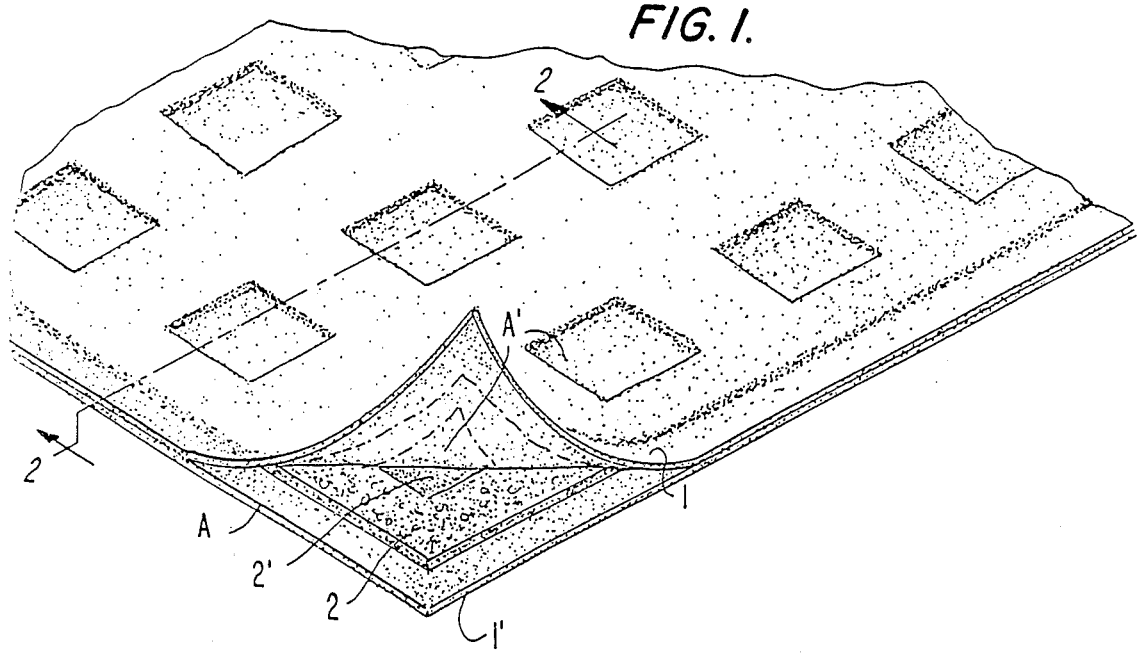

Referring to the drawings, a pair of outer chamois leather skins 1 and 1' (shown upper and lower) is shown composited, laminated or sandwiched on opposite sides of an intermediate foam layer(s) 2, illustrated in a waffle-like matrix form having voids, openings or interstices 2' periodically patterned therein. The sandwich is bonded by appropriate adhesive, later described, applied on the opposing inner surfaces of the outer chamois skin layers 1 and 1' at selected regions only thereof; namely, along the peripheral chamois skin-to-skin margins of the composite, extending beyond and framing the foam layer, and at the periodic voids or opening 2' in the foam layer at A'. The sandwich is compressed on both sides in formation at the marginal regions A with adhesive interposed to secure and seal opposing peripheral inner surfaces of the chamois skins; and also at the periodic regions A' throughout the foam layer to form the waffle-like structure, with opposing inner surface regions at A' adhering to one another, whereby water-absorbing, uncompressed reservoir foam pockets 2 are provided everywhere along the composite except at the compressed and adhered margins in or periphery of the skins at A and at the compressed regions.

In operation, when used in the normal fashion of ordinary chamois skins, as for wiping moist surfaces or the like, water passes through the unbonded regions of the sandwich, namely through the regions of the outer chamois skins covering the uncompressed water-absorbing foam pockets 2, and is held in the foam reservoirs provided by the pockets until the structure is subjected to external wringing-out or similar forces. As before stated, the water-holding characteristics of the portions of the chamois skins encasing the foam reservoirs 2 combine synergistically with the greater absorption characteristics per unit weight, volume and surface area of the foam, effectively to imbue the chamois skins with significantly increased water-absorption characteristics. The marginal or peripheral directly compressed chamois bonding seals at A and in the voids at A' are not so readily water-transmitting through the structure in view of the impervious bonding adhesive thereat; but the outer fibers of the outer chamois skins provide water absorption and release upon squeezing or wringing. The water passes through the chamois skins bounding and encasing the matrix of foam pockets 2 and is readily received in the more open foam reservoirs which, as previously explained, have greater water-holding capacity per unit weight and volume. In wringing or squeezing out, the water in the foam reservoir regions is squeezed through the adjacent chamois skin regions, but the invention permits less often wringing per usage in view of the increased capacity of the structure.

Turning, now, to the critical requirements of the foam, matrix and bonding, the foam itself must be sufficiently soft, thin and flexible not to impair the "hand" or feel of the chamois skins in use or the ease of wringing out. The use of a matrix with voids, interstices or openings is essential since appropriate adhesive bonding layers are water impervious. The overall matrix open area of the foam matrix must be sufficient to provide significantly increased water-absorption, and the bonding must be sufficiently strong and reliable to hold the composite permanently together despite repeated uses and to protect the chamois encasing of the foam from separation or tears and consequent leaks in the structure, and also to prevent water escape through foam openings on the sides. It has been found that the bonded regions should occupy a minor portion of the total sandwich area, as later explained. Both the bonding and the foam, moreover, must be capable of standing up to time, washings, solvents and alkali (soap) conditions. An added feature of the invention, moreover, is the enabling of the use of chamois skins that may have one aesthetically imperfect, discolored or disfigured surface, since the same may be used as a hidden inner surface in the composite sandwich structure.

In tests designed to provide a best mode structure, a wide range of foams were employed and found wanting. The hardening of cellulose sponge foam upon drying was unacceptable. Such and other plastic foams, moreover, did not provide sufficiently ready passage of water in and out, or did not have sufficient surface tension in their air pockets or boundaries to hold the water adequately, even under gravity and slight forces, or had insufficient propensity for osmotic pressure, or exhibited no substantial capillary effort.

Similarly, tests on suitable bonding techniques and adhesives (latex/acrylic/rubber/neoprene/urethane and others), were conducted. Flame lamination was tried but was found to destroy genuine chamois (boil-shrinkage temperature of about 140 degrees F.); and pressure-sensitive adhesive was tried, but the soft chamois of premium quality does not reliably or adequately bond and prevents production line-up difficulties.

Figure 2:
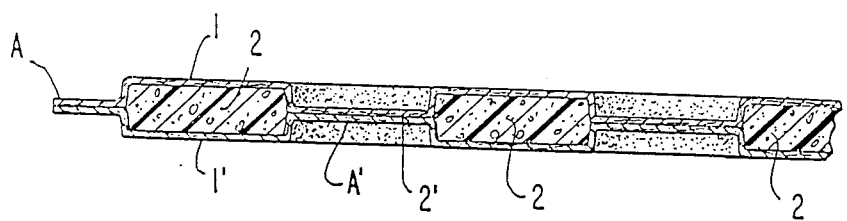
FIG. 2 is a transverse section taken along the line 2—2 of FIG. 1.

An admirably suitable composite was finally evolved using chamois skins 1 and 1' about 0.4 to 0.7 millimeters in thickness, about ¼ inch thick urethane foam of 1.2 standard density, ethylaldehyde dispersion EAA (Key Polymer Company, Lawrence, Mass.) water-based with ammonia; and a matrix pattern of about 70% (major) area coverage of foam reservoirs in the waffle-pattern matrix of FIGS. 1 and 2, and 1×¾ inch compressed regions A' spaced every ¾ inch in a pad or sheet 12×14 inches, with 3/16 inch margins A. Aqueous-based adhesives are considered preferable because solvents needed to cut solvent-based adhesives are often flammable; but another useful adhesive is of the Type 4048 (Bostic Co. of Middleton, Mass.) that also resists alkali, water, oils and vinyl plasticizers.

The following Table I of measured and calculated data was observed comparing the composite sandwich laminate of the invention, above described, with the individual chamois layers (I and II) and intermediate foam matrix layer 2, and demonstrated the synergistic substantially increased water absorption and delivery characteristics of the composite:

TABLE I

| | DATA | | |
|---|---|---|---|
| | WEIGHTS IN GRAMS | | |
| MATERIAL | DRY WT. | WET WEIGHT | SQUEEZED WT. |
| Laminate Assembly | 36.7 | 305.2 | 114.4 |
| Chamois I | 21.5 | 122.0 | 61.8 |
| Chamois II | 22.3 | 116.5 | 78.7 |
| Foam | 4.6 | 75.6 | 17.3 |
| | CALCULATED DATA | | |
| MATERIAL | | WET WEIGHT GAIN (%) | WATER DELIVERED % OF WT. GAIN |
| Laminate Assembly | | 731% | 63.7 |
| Chamois I | | 467% | 49.4 |
| Chamois II | | 422.4% | 31.9 |
| Foam | | 1543% | 77.6 |
| | TOTAL FROM COMPONENTS | | |
| DRY WT. | | WET WT. | SQUEEZED WT. |
| 48.4 g | | 314.1 | 157 g |
| | WEIGHT GAIN % | | |
| 548.8% | | | 50.1% |

Thus, while the chamois skin itself will absorb about 450% of its dry weight and deliver, upon wringing or squeezing, about 30 to 50% of the absorbed water, and the foam will absorb very large amounts of water and deliver about 75–80% of that water upon squeezing, the composite laminate assembly structure of the invention absorbs more water than the sum of the components on an equivalent weight basis (548.8%) and also delivers more on an equivalent weight basis (50.1%) than the sum of the components. The laminated assembly is not only a better carrier of water than chamois alone, but it appears to combine the better characteristics of chamois and foam.

A preferred technique in the fabrication of the composite of the invention is to apply a screening pattern, as with the waffle matrix design of FIG. 1, to the chamois inner surface, then apply the adhesive, remove the screen, apply a foam matrix layer having the screen pattern, and laminate or press the chamois layers to sandwich with the intermediate foam—for example, in the waffle compression pattern of FIG. 1.

Other patterns of foam matrix may, of course, readily be used, either, as preferred, in the form of a plurality of openings or regions at which the chamois skins are bonded together, or in the form of a matrix of spaced bonding regions on the foam which are bonded to the skins, though it is necessary to insure that adequate unbonded area (say about 70% or greater) be maintained to keep the desired "hand" and feel and to provide the desired degree of absorbency increase.

Figure 3:
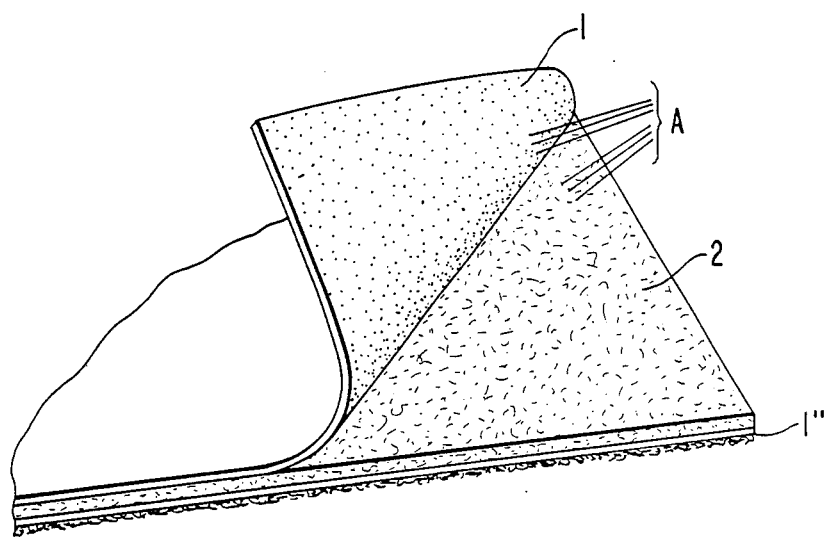
FIG. 3 is a view similar to FIG. 1 of a preferred embodiment employing one outer chamois skin layer and a roughened surface opposite layer.

While both sides 1 and 1' of the composite chamois-foam-chamois laminate afford the drying and wiping characteristics of the chamois material in the embodiments of FIGS. 1 and 2, one side of the laminate, if desired, may have different characteristics than chamois, such as scrubbing or scouring properties. This may be achieved when one of the chamois skins is replaced by a porous and rough-textured layer as before mentioned, such as a terry cloth layer 1'', FIG. 3. In such application, as a further illustration of the versatility of the invention, the laminate of sandwich may be compressed totally flat, FIG. 3, and not waffled with large uncompressed pockets as in FIGS. 1 and 2. By using the urethane or similar foam thin inner layer, it has been found that the adhesive can be applied between the inner surface of the chamois layer 1 and the adjacent outer surface of the foam layer 2, and between the inner surface of the terry cloth or similar scrubbing or other-propertied outer layer 1''- and the opposite outer surface of the inner foam reservoir 2, such that the total compressing and laminating causes the adhesive to bond only at a random matrix of minute points or regions A of the compressed outer surfaces of the foam layer, enabling remarkable reservoir action around the surface-bonded points and without requiring uncompressed larger pockets as in FIG. 1. Opening the laminate shows such point adhesion only at a martrix of spaced high points of the compressed foam surfaces, occupying substantially half of the surface area, more or less. Thus a large open or void foam area and volume throughout the laminate is provided, most sufficient to give the necessary synergistic reservoir action before described, with the more flexible terry cloth layer 1'' acting also as a membrane, though not as effective in such capacity as a second chamois skin layer.

In a successful pad of this structure, the chamois skin layer 1 of the previously described thickness and a terry cloth layer 1'' of about the same thickness are unitarily laminated with the foam layer, which becomes compressed to a thickness of only about twice that of the outer layers, about 1/16 inch.

Further modifications will also occur to those skilled in this art, and such are considered to fall within the spirit and scope of the invention as defined in the appended claims.

What is claimed is:

1. A chamois-foam sandwich composite comprising a pair of thin outer layers of real chamois skin laminated together with a thin, soft, flexible foam layer therebetween, the layers being adhesively bonded in a matrix of spaced points or regions, with the adhesive area embraced by the bonded regions occupying a minor portion of the surface area and bounding reservoir foam pockets.

2. A chamois-foam sandwich as claimed in claim 1 and in which the chamois layers extend marginally beyond the foam layer and are adhered together to seal the sandwich.

3. A chamois-foam sandwich as claimed in claim 2 and in which the adhesively bonded spaced regions are disposed throughout the foam layer.

4. A chamois-foam sandwich as claimed in claim 3 and in which openings in the foam are provided at said spaced regions at which the opposing inner surfaces of the chamois layers are adhered.

5. A chamois-foam sandwich as claimed in claim 3 and in which the sandwich is compressed on both sides at the margin and spaced regions for form a waffle-like structure with the intermediate foam pockets uncompressed.

6. A chamois-foam sandwich as claimed in claim 1 and in which the foam layer is of plastic foam and its reservoir pockets occupy about 70% or more of the sandwich surface area.

7. A chamois-foam sandwich as claimed in claim 6 and in which the foam plastic layer is thicker than the chamois skin layers but thin enough to enable the sandwich to maintain substantially the "hand" and feel thereof.

8. A chamois-foam sandwich as claimed in claim 3 and in which the chamois skin layers are of the order of about 0.4 to 0.7 mm thick, the foam layer is of urethane foam about ¼ inch thick, and the bonding adhesive is an aqueous-based adhesive resistant to alkali, water and oils.

9. A chamois-foam sandwich as claimed in claim 8 and in which said adhesive is an ethyl aldehyde dispersion.

10. A method of imbuing chamois-skin layers with water absorbency and without substantial change in "hand" and feel, that comprises, producing a pattern of spaced regions occupying a minor portion of the surface area of the layer along the inner surface of one or both of a pair of opposing thin layers of real chamois skin to which adhesive is applied, laminating the pair of thin chamois skin layers together with a thin, soft, flexible foam plastic layer therebetween, providing the foam layer with a pattern of openings aligned with said spaced regions, and compressing the chamois layers at said regions to adhere the same.

11. A method as claimed in claim 10 and in which the margins of the chamois layers are extended beyond the foam layer and the inner surfaces thereof are adhesively sealed.

12. A method of imbuing chamois skin layers with water absorbency and without substantial change in "hand" and feel, that comprises, producing a pattern of spaced adhesive regions along the inner surfaces of a pair of opposing layers of real chamois skin, laminating the pair of thin chamois skin layers together with a thin, soft, flexible foam plastic layer therebetween and with the margins of the chamois layers extending beyond the foam layer, compressing the laminate at the said spaced regions and at the said margins to bond the same thereat, with intermediate regions comprising uncompressed foam reservoirs encased by said chamois layers and occupying the major portion of the laminate surface area.

13. A chamois-foam sandwich comprising a pair of thin outer water permeable layers, at least one of which is real chamois skin, laminated together with a thin, soft, flexible foam layer therebetween, at least portions of the chamois skin layer being compressed and adhesively bonded to the foam layer at spaced points in the sandwich as thus compressed.

14. A chamois-foam sandwich as claimed in claim 13, wherein said outer layers extend marginally beyond the foam layer and are adhered together marginally to seal the sandwich.

15. A chamois-foam sandwich as claimed in claim 13, wherein at least about 70% of the area of said chamois layer is unbonded.

16. A chamois-foam sandwich as claimed in claim 13, wherein said foam is urethane and wherein the bonding adhesive is an aqueous-based adhesive resistant to alkali, water, and oils.

17. A chamois-foam sandwich as claimed in claim 16, wherein the bonding adhesive is an ethyl aldehyde dispersion.

18. A chamois-foam sandwich as claimed in claim 16, wherein the chamois skin is from about 0.4 to 0.7 mm thick and where said foam is about ¼ inch thick.

19. A chamois-foam sandwich as claimed in claim 13 and in which the other outer water permeable layer is of porous fabric.

20. A chamois-foam sandwich as claimed in claim 19 and in which the fabric layer is provided with a scrubbing outer surface.

21. A chamois-foam sandwich as claimed in claim 20 and in which the fabric layer is of terry cloth.

22. A chamois-foam sandwich as claimed in claim 19 and in which said spaced points comprises high points of the foam layer outer surfaces.

* * * * *